US012054434B2

(12) United States Patent
Birol et al.

(10) Patent No.: US 12,054,434 B2
(45) Date of Patent: *Aug. 6, 2024

(54) FABRICATION OF MULTILAYER CERAMIC STRUCTURES BY CONTINUOUS FILAMENTS OF DIFFERENT COMPOSITION

(71) Applicant: ASELSAN ELEKTRONIK SANAYI VE TICARET ANONIM SIRKETI, Ankara (TR)

(72) Inventors: Hansu Birol, Ankara (TR); Mehmet Erim Inal, Ankara (TR); Akin Dalkilic, Ankara (TR); Sebnem Sayginer, Ankara (TR); Ozgur Birer, Ankara (TR); Mustafa Fatih Akbostanci, Ankara (TR)

(73) Assignee: ASELSAN ELEKTRONIK SANAYI VE TICARET ANONIM, Sirketi Ankara (TR)

( * ) Notice: Subject to any disclaimer, the term of this patent is extended or adjusted under 35 U.S.C. 154(b) by 243 days.

This patent is subject to a terminal disclaimer.

(21) Appl. No.: 17/632,241

(22) PCT Filed: Sep. 20, 2019

(86) PCT No.: PCT/TR2019/050778
§ 371 (c)(1),
(2) Date: Feb. 2, 2022

(87) PCT Pub. No.: WO2021/054907
PCT Pub. Date: Mar. 25, 2021

(65) Prior Publication Data
US 2022/0348508 A1 Nov. 3, 2022

(51) Int. Cl.
*C04B 35/80* (2006.01)
*C04B 35/10* (2006.01)
(Continued)

(52) U.S. Cl.
CPC .............. *C04B 35/80* (2013.01); *C04B 35/10* (2013.01); *C04B 35/14* (2013.01); *C04B 35/565* (2013.01);
(Continued)

(58) Field of Classification Search
CPC ......... C04B 35/80; C04B 35/10; C04B 35/14; C04B 35/565; C04B 41/4584;
(Continued)

(56) References Cited

U.S. PATENT DOCUMENTS 4,358,772 A 11/1982 Leggett
4,615,859 A 10/1986 Traut
(Continued)

FOREIGN PATENT DOCUMENTS

CN 106564229 A 4/2017
CN 107253864 A 10/2017
(Continued)

OTHER PUBLICATIONS

B. Kumar, et al., Woven fabric structures and properties, Engineering of High-Performance Textiles, 2018, pp. 133-151.
(Continued)

*Primary Examiner* — Seung H Lee
(74) *Attorney, Agent, or Firm* — Bayramoglu Law Offices LLC

(57) ABSTRACT

A method for constructing multiple ceramic layers by winding continuous ceramic filaments of different compositions to prepare multilayer RF-transparent structures is provided. In the method, different continuous ceramic filaments are braided to construct layers with specific dielectric constants and braiding count/thickness. Layers with same or different dielectric characteristics forms a sandwich design to fulfill the desired mechanical, thermal and electrical requirements.

7 Claims, 2 Drawing Sheets

(51) Int. Cl.
    *C04B 35/14*     (2006.01)
    *C04B 35/565*     (2006.01)
    *C04B 41/45*     (2006.01)
    *C04B 41/50*     (2006.01)
    *C04B 41/87*     (2006.01)
    *H01Q 1/42*     (2006.01)

(52) U.S. Cl.
    CPC ...... *C04B 41/4584* (2013.01); *C04B 41/5025* (2013.01); *C04B 41/87* (2013.01); *H01Q 1/422* (2013.01); *H01Q 1/425* (2013.01); *C04B 2235/3217* (2013.01); *C04B 2235/3418* (2013.01); *C04B 2235/3826* (2013.01); *C04B 2235/5256* (2013.01); *C04B 2235/616* (2013.01)

(58) Field of Classification Search
    CPC ............... C04B 41/5025; C04B 41/87; C04B 2235/3217; C04B 2235/3418; C04B 2235/3826; C04B 2235/5256; C04B 2235/616; C04B 2237/584; C04B 35/571; C04B 2235/483; C04B 2235/5224; C04B 2235/5232; C04B 2235/5252; C04B 2237/38; C04B 35/111; H01Q 1/422; H01Q 1/425; B32B 18/00
    See application file for complete search history.

(56) References Cited

U.S. PATENT DOCUMENTS

| | | | |
|---|---|---|---|
| 4,615,933 A | 10/1986 | Traut | |
| 5,738,750 A | 4/1998 | Purinton et al. | |
| 6,270,853 B1 * | 8/2001 | Brown | B05D 1/045 427/470 |
| 6,460,807 B1 * | 10/2002 | Braitinger | F42B 15/34 244/171.1 |
| 7,118,802 B2 | 10/2006 | Simon et al. | |
| 8,562,901 B1 * | 10/2013 | Mah | C04B 35/195 264/642 |
| 9,673,518 B2 | 6/2017 | Di Martino et al. | |
| 2002/0163109 A1 | 11/2002 | Kirby et al. | |
| 2009/0096687 A1 | 4/2009 | Gentilman et al. | |
| 2022/0411337 A1 * | 12/2022 | Birol | C04B 35/571 |

FOREIGN PATENT DOCUMENTS

| | | |
|---|---|---|
| CN | 106564229 B | 7/2019 |
| GB | 2075269 A | 11/1981 |
| JP | 2014097654 A | 5/2014 |
| JP | 6261275 B2 | 1/2018 |
| WO | 9218213 A1 | 10/1992 |

OTHER PUBLICATIONS

Kadir Bilisik, et al., 3D Fabrics for Technical Textile Applications, Non-woven Fabrics, 2016, pp. 81-141.
Bernd Clauss, et al., Modern Aspects of Ceramic Fiber Development, Advances in Science and Technology, 2006, pp. 1-8, vol. 50.
Bernd Clauss, Fibers for Ceramic Matrix Composites, Ceramic Matrix Composites, 2008, pp. 1-20.
3M Nextel Ceramic Textiles, Fibers and Composites, Nextel Application Brochure, 2017, pp. 1-16.
Ceramic Fibers and Coatings Advanced Materials for the Twenty-First Century, 1998, pp. 1-95, National Academy Press.
U.S.A.F. Avionics Laboratory, Development of Lightweight Broadband Radomes From Slip-Cast Fused Silica, 1966, retrieved from: https://smartech.gatech.edu/handle/1853/48321.
David C. Chang, A Comparison of Computed and Measured Transmission Data for the AGM-88 Harm Radome, MSc Thesis, Naval Postgraduate School, 1993, pp. 1-58.

* cited by examiner

FABRICATION OF MULTILAYER CERAMIC STRUCTURES BY CONTINUOUS FILAMENTS OF DIFFERENT COMPOSITION

CROSS REFERENCE TO THE RELATED APPLICATIONS

This application is the national phase entry of International Application No. PCT/TR2019/050778, filed on Sep. 20, 2019, the entire contents of which are incorporated herein by reference.

TECHNICAL FIELD

The present invention relates to a method by which multiple ceramic layers are constructed by winding continuous ceramic filaments of different composition to prepare multilayer RF-transparent structures.

BACKGROUND

Advanced radar systems in hypersonic missiles impact the materials and the production techniques used in traditional radome technology. The need to detect multiple targets effectively and faster by the radar whilst withstanding the elevated temperatures, thermomechanical loads and hostile environmental factors challenge the development of high-end missile radomes.

Fiber-reinforced ceramic matrix composite (FR-CMC) is a promising solution to address most of the aforementioned concerns. These composites are manufactured by preparing 2D (woven, weft knitted, braided, warp knitted) or 3D (3D woven, 3D spacer) fabrics using filaments such as fibers, which are then impregnated by a ceramic suspension. The ceramic fiber can be oxide or non-oxide depending on the application.

CMC technology to develop missile radomes have gained a significant momentum in the last decades. U.S. Pat. No. 5,738,750 explains the method to develop multilayer radome layers in which a honeycomb structure is covered with piles of quartz cloth that is composed of silica fiber (65 wt %) infiltrated by silica-based resin (35 wt %) on both sides of the honeycomb. The inorganic resin is either polysilicone or polysilozane, which is converted to silica or silicon nitride after pyrolysis, respectively. However, a clear description of how the radome shape is formed by joining these layers is not clearly mentioned.

In U.S. Pat. No. 7,118,802, the requirements for a missile radome flying at 6+ Mach is disclosed. The proposed structure is composed of a load bearing layer of colloid-impregnated FR-CMC and a thermal insulation layer. The colloid is a ceramic suspension with 40-50% wt. solids loading (alumina or silica), while the insulation layer is a foam with 45% opening filled with ceramic particles. The layers are bonded with a high temperature stable adhesive. Similar to the previously-mentioned patent, this document also lacks a clear description of how the radome is shaped by using these individual layers.

The construction of the broadband HARM anti-radiation missile is sketched in. According to this model, 3 mm thick, low dielectric honeycomb structure is sandwiched between the thinner, high dielectric layers. Similar to the disclosed information in open literature, there is no explanation as to how the broadband radome is constructed.

Fabrication of ceramic broadband missile radomes impose several restrictions on the selection of materials and production technologies. Although the materials for super/hypersonic missile radomes are well-known for decades, it is relatively recent to adopt the high-end technologies to develop broadband radomes flying at high Mach numbers. Consequently, there is limited information on fabrication of ceramic broadband radomes, which are most likely prepared either by functional grading or by sandwich structures fulfilling the broadband characteristic.

Previous efforts mostly focus on shaping big, one-layer ceramic radomes operating at narrow/single band. Molding combined with tooling (U.S. Pat. No. 2002/0163109), cold isostatic pressing of cylinders and machining (U.S. Pat. Nos. 9,673,518; 4,615,859; 4,615,933), slip casting, slip casting followed by chemical vapour deposition (CVD) (U.S. Pat. No. 4,358,772), additive manufacturing (U.S. Pat. No. 2009/0096687) are some of the techniques mentioned in literature.

Based on this information and on our experience, the factors which impede the progress in fabrication of ceramic broadband radomes are the fragile nature of the ceramic material and the CTE (Coefficient of Thermal Expansion) mismatch between the individual ceramic layers of the multilayer structure leading to micro cracks and delamination during firing.

SUMMARY

The present invention is a method by which multiple ceramic layers are constructed by winding continuous ceramic filaments of different composition to prepare multilayer RF-transparent structures. The fibers are selected from low and high dielectric constant ceramics such as $SiO_2$ and $Al_2O_3$, respectively. Once the multiple layers are constructed according to a pre-determined sandwich design, the structure is removed from the winding surface (e.g., mandrel), infiltrated with resin in a separate set up and fired.

Fabrication of the ceramic broadband missile radomes by ceramic fiber networks as discussed in this invention has the following distinctive features:

Intrinsically fragile ceramic material is shaped on a mandrel with continuous ceramic filaments, which are bendable and flexible.

The filaments can be selected from fibers, fiber bundles and fabrics.

The filaments (termed as fibers from this point on) can be selected from a range of oxide or non-oxide ceramics such as $SiO_2$, $Al_2O_3$, SiC or the mixed compositions thereof The fibers can be of pure ceramic, organic vehicle added or PDC (Polymer Derived Ceramic) origin, which are converted to pure ceramic after debinding and firing.

Fibers of organic and synthetic nature (cotton, Aramid, Kevlar, polyacrylonitrile and similar) can also be used as sacrificial layers forming porosity (low dielectric regions) in the structure up on firing.

The fibers can be wound, wrapped or braided on a support such as mandrel in x, y, and z directions processes termed as braiding from this point on).

Each layer of the structure is formed by braiding the continuous ceramic fiber of specific composition exhibiting a specific dielectric constant. The layers are braided in specific designs (such as A/B/C/D type sandwich) to assure the adequate broadband RF-performance.

Braided layers on the mold are removed from the mold as a basket and impregnated with a resin of defined composition under vacuum or pressure yielding a near net shape structure in the green state already. This also permits green-machining, which accelerates the typical machining times for sintered bodies.

Only one type of slurry (resin) is used, which forms the matrix. Therefore, there is no concern of resin incompatibility between the layers.

The use of one resin in all layers eliminates the risk of CTE mismatch-related defects, since it represents one matrix of homogenous composition across the layers.

The resin composition can be pure ceramic or inorganic-based, which is converted to ceramic up on sintering through oxidation or pyrolysis.

The new structure is much tougher due to the inorganic resin that fills the inter-fiber space. This composite structure helps the structure fail gradually under operational conditions instead of sudden and catastrophic fracture as in pure ceramic body.

The final structure is near net shape, which avoids the complex and time taking processes leading to low productivity by conventional techniques.

DETAILED DESCRIPTION OF THE EMBODIMENTS

Figure 1:
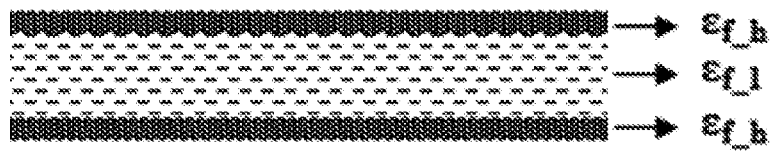
FIG. 1 shows sandwich structures using different fibers, where the dielectric constant $\varepsilon_{f\_h} > \varepsilon_{f\_l}$.
Figure 1:
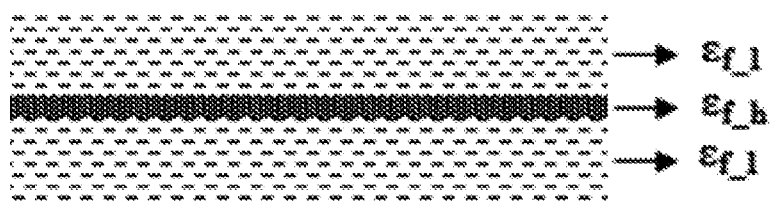
Figure 1:
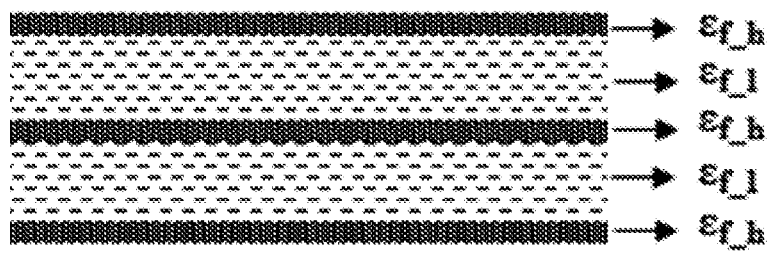
Figure 1:
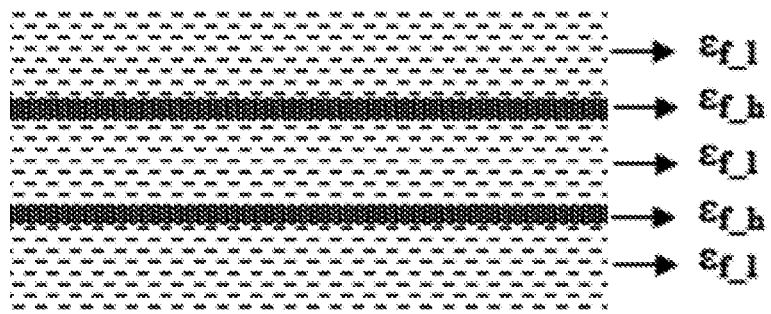

The fiber-reinforced ceramic matrix composites (FR-CMC) are advanced and tailorable materials with improved toughness and damage tolerance compared to bulk ceramics. Broadly speaking, the reinforcing fibers can be classified as inorganic and organic fibers. The inorganic fibers can be further splitted to non-metallic and metallic fibers, while the organic fibers are mostly carbon and polymer fibers. The ceramic fibers belong to the non-metallic inorganic fibers family together with the glass/mineral and single crystal fibers.

The fiber material selection for CMC application is of paramount importance. It is known that the temperatures on radome material during high Mach number flights reach up to 1.000° C. limiting the choice of the fiber material. Polymer and glass fibers have 500° C. and 700° C. of degradation temperatures, respectively, which restrict their effective use in CMCs at higher temperatures. Therefore, the ceramic fibers come out as the right choice to support the high performance CMCs for airborne components exposed to elevated temperatures and mechanical/thermomechanical loads at higher speeds.

The ceramic fibers are classified as oxide or non-oxide ceramics. The ones in the former group are alumina ($Al_2O_3$) based fibers exhibiting high environmental stability but limited high temperature creep performance. The alumina composition of such fibers can be selected in a range from 10% to 100%. The non-oxide ceramic fibers are mostly SiC, which have excellent thermal creep behavior coupled with poor chemical stability. SiC portion of these fibers can vary in the 10% to 100% range depending on the operational specifications. For both fiber classes, crystallinity, morphology, uniformity along the material and the surface properties are important characteristics impacting the CMC performance in the field. Fiber coating is another critical factor determining the damage tolerance of the structure by providing a weak interface between the fiber and the matrix.

The selection between the two fiber types strongly depends on the type of the matrix or the inorganic resin filling the fiber network. The oxide fibers should ideally be used with the oxide matrix (oxide composite) and the non-oxide with the non-oxide matrix (non-oxide composite). However, intermediate mixtures are also prepared by different processing techniques, which lead to newer applications.

As for oxide composites, the fibers prepared with pure $Al_2O_3$ or $Al_2O_3$ blended with $SiO_2$ and $B_2O_3$ at lower concentrations significantly increase the oxidation and the alkaline resistance of CMC. For non-oxide composites, SiC fibers coated with C or BN allow the SiC matrix composite resist high temperature deformation. The comparison between the fiber and the bulk forms of the $Al_2O_3$ and SiC ceramics are presented in Table 1. The significantly superior tensile strength of the fiber over the bulk is worth mentioning for consideration of these fibers under severe environmental conditions.

TABLE 1

Comparison of ceramic fiber vs. bulk ceramic properties

| Material Properties | Unit | $Al_2O_3$ | | SiC | |
| --- | --- | --- | --- | --- | --- |
| | | Fiber[a] | Bulk[b] | Fiber[c] | Bulk[d] |
| Density | g/cm$^3$ | 3.90 | 3.90 | 3.10 | 3.20 |
| Tensile Strength | MPa | 2.930 | 400 | 2.600 | 540 |
| Elastic Modulus | GPa | 373 | 380 | 420 | 430 |
| CTE (40-800° C.) | ppm/° C. | 8.00 | 8.00 | 3.00-3.50 | 3.70-4.40 |
| Continuous Use Temperature | ° C. | 1.000* | ~1.000[+] | 1.150** | ~1.000[+] |

[a]Nextel 610,
[b]Kyocera A601D (>99%),
[c]Nippon Carbon Hi-Nicalon "S" (99.8%),
[d]Kyocera SC211
*Single filament ≤ 1% strain/69 MPa/1.000 hr
**Single filament 500 MPa/1.000 hr
[+]estimated To sum up, the ceramic fibers provide toughness while improving the damage tolerance of the bulk ceramics. The super/hypersonic missile radomes produced as bulk ceramics from materials such as fused silica, Magnesium Aluminum Silicate, Lithium Aluminum Silicate, $Si_3N_4$, SiAlON, $Al_2O_3$ run the risk of catastrophic failure under extreme conditions due to their fragile nature. The techniques used in production of these ceramics such as slip casting, glass melt casting, hot molding have low yields due to the fracture of the ceramic during consolidation, drying, firing and machining steps.

The focus of this patent is the method by which the ceramic fiber-reinforced CMCs are prepared. By following this method, the ceramic fibers and the inorganic resins compatible with these fibers can be used to prepare the airborne structures such as radomes, microwave-transparent shields, caps and noses for military and civil applications flying at subsonic, supersonic and hypersonic velocities. There is no restriction in combination of available fibers and resins as long as the materials compatibility and the RF-transparency at desired frequencies are fulfilled. Moreover, the method is applicable to build both broad, narrow and single band radomes. The type and the diameter of the fiber, braiding type, fiber aperture and thickness per layer, slurry material composition are engineered for the desired electromagnetic performance. Moreover, significant improvement can be achieved in the structural integrity if the ceramic fibers at consecutive layers are wrapped in an angular orientation between 15°-135°.

In this invention, the continuous ceramic fibers are used to form the multiple layers of the broadband radome. The dielectric constant of each layer is identified by the fiber material, its thickness and the slurry material. The broadband characteristic of the radome can be optimized by changing such individual layers varying in low and high dielectric constant. The concept and the procedure of layer build up is presented in FIG. 1 and explained as follows:

- For A-type sandwich: The 1st (innermost) and $3^{rd}$ (outermost) layers can be constructed by ceramic fibers of higher dielectric constant with lower wrap count ($\varepsilon_{f\_h}$), whilst the fiber in the middle is of low dielectric constant material with higher wrap count ($\varepsilon_{f\_l}$).
- For B-type sandwich: The 1st (innermost) and $3^{rd}$ (outermost) layers can be constructed by ceramic fibers of lower dielectric constant with higher wrap count ($\varepsilon_{f\_l}$), whilst the fiber in the middle is of high dielectric constant material with lower wrap count ($\varepsilon_{f\_h}$).
- For C-type sandwich: The $1^{st}$, $3^{rd}$ and $5^{th}$ layers can be constructed by ceramic fibers of higher dielectric constant with lower wrap count ($\varepsilon_{f\_h}$), whilst the 2nd and $4^{th}$ fibers are of low dielectric constant material with higher wrap count ($\varepsilon_{f\_l}$).
- For D-sandwich: The $1^{st}$, $3^{rd}$ and $5^{th}$ layers can be constructed by ceramic fibers of lower dielectric constant with higher wrap count ($\varepsilon_{f\_l}$), whilst the 2nd and $4^{th}$ fibers are of high dielectric constant material with lower wrap count ($\varepsilon_{f\_h}$).

Figure 2:
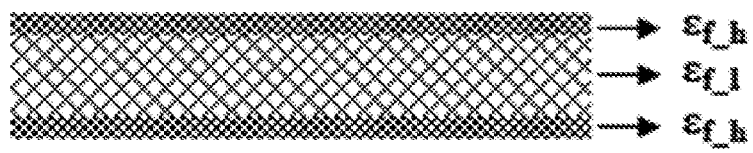
FIG. 2 shows sandwich structures using different fabrics, where the dielectric constant $\varepsilon_{f\_h} > \varepsilon_{f\_l}$.
Figure 2:
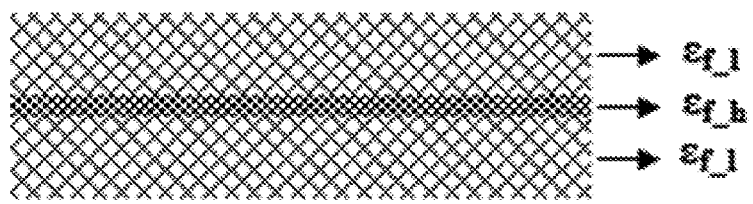
Figure 2:
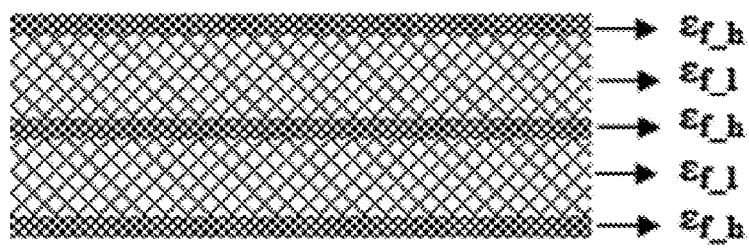
Figure 2:
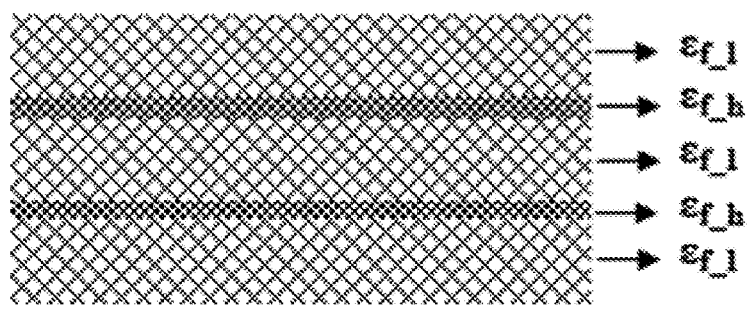

Alternatively, the ceramic fabrics can also be used to construct sandwich ceramic structures as an alternative to the fibers. The fabrics are wider than fibers and hence, they accelerate the fabrication process. Should the fabrics replace the fibers, the layers can be constructed in different design alternatives as shown in FIG. 2.

Once the continuous fibers are wrapped on the mandrel and all layers of the structure satisfying the desired broadband performance are piled up, the structure is removed from the mandrel. It is basically a basket formed by an intense fiber network braided according to a specific design, which is ready for infiltration. The slurry infiltration is the process during which the slurry fills the inter-fiber gaps. This process can best be conducted under vacuum, where the fiber basket is placed in a special chamber filled with the slurry. In an embodiment, prior to braiding on it, a support surface (e.g., mandrel) is coated with a non-sticking chemical to facilitate the easy removal of the braided structure at the end of the process.

As a second alternative, the basket can be placed between and supported by female and male molds made of stainless steel with non-sticking surfaces, which are fed with the slurry. In both methods, the vacuum is applied to the closed chamber or molds, which moves the slurry with optimized rheology into the open space between the fibers.

In a different method, the basket can be dipped in a container full of thick slurry. The structure is then exposed to vacuum from the opposite side without slurry (inner side), which pulls the slurry into the apertures between the fibers.

In all of these methods, the integrity of the fiber structure must be observed carefully and preserved intact against a possible deformation caused by vacuum. As further processing, machining of the fired structures can also be considered and applied with no detrimental effects on the structure as the fibers follow the contour defined by the matrix.

The slurry infiltrated fiber network is dried and debinded cautiously. Since all thermal process have the potential to generate irreversible impacts on the structure such as crack initiation and propagation, fracture, sagging, bulging, collapsing, the debinding and sintering profiles must be carefully optimized. Therefore, the raw materials must be carefully characterized in terms of their compositions and rheological and thermo-mechanical behavior prior to processing.

The described invention is applicable for continuous oxide/non-oxide fibers and the slurries compatible with these fibers. In other words, the fiber-slurry pair has to be defined together to guarantee the materials' compatibility and the performance of the final structure. The fibers should have a sintering temperature comparable to the temperature stability range of the matrix, low CTE, low dielectric constant and loss and high thermo-stability and mechanical strength. Moreover, these characteristics are expected to be preserved/slightly deviate with temperature fluctuations. Most of these requirements can be optimized in the fused silica system, which is used in commercial missile radomes for decades. Therefore, PDC-based slurries with polysilicone, polysilozane, polycarbosilane are candidate slurries to use with selected fibers. Alternatively, slurries with materials such as alumina at varying compositions can also be used as long as the aforementioned fiber-slurry specs are matched.

The fiber selection for current radome materials such as fused silica, Magnesium Aluminum Silicate, Lithium Aluminum Silicate, $Si_3N_4$, SiAlON, $Al_2O_3$ is limited. Among all commercial products, $Al_2O_3$ and SiC are the commercially-available candidates for oxide and non-oxide fibers, respectively. The former is produced in different compositions to address the requirements in diverse applications, whilst the latter is not fully appropriate as a radome material due to its reported semi-conductive character at high temperatures.

The invention claimed is:

1. A method for preparing a multilayer ceramic structure, comprising:
    winding continuous ceramic fibers of different compositions to construct layers, wherein each of the layers has a specific dielectric constant, wherein
    each layer is designed to have a specific winding angle, a wound fiber thickness and space between the continuous ceramic fibers to guarantee a desired broadband RF response of an object,
    the continuous ceramic fibers are wound in an angular orientation between 15°-135° to optimize a structural integrity and a RF performance;

forming the multilayer ceramic structure comprising multiple layers with different dielectric characteristics as a sandwich;

applying a slurry infiltration over the multilayer ceramic structure constructed to fill inter-fiber gaps and obtain a finished structure, wherein the inter-fiber gaps are open spaces between the continuous ceramic fibers.

2. The method according to claim 1, further comprising:
coating a support surface with a non-sticking chemical prior to the step of braiding to facilitate a removal of the layers braided.

3. The method according to claim 1, wherein the slurry infiltration is conducted under vacuum to move a slurry with optimized rheology into the inter-fiber gaps.

4. The method according to claim 3, wherein in the slurry infiltration,
the multilayer ceramic structure is placed in a chamber or a container filled with the slurry or placed between and supported by a female mold and a male mold,
wherein the female mold and the male mold are made of stainless steel with non-sticking surfaces, and
the female mold and the male mold are fed with the slurry under pressure.

5. The method according to claim 1, wherein the multilayer ceramic structure is applicable to build broad, narrow, and single band missile radomes.

6. The method according to claim 1, wherein the finished structure is near net-shape, minimizing a post-processing time and a related product damage or a related product loss.

7. The method according to claim 1, wherein the winding step comprises wrapping and braiding techniques.

* * * * *